(12) United States Patent
Tam et al.

(10) Patent No.: US 7,935,283 B2
(45) Date of Patent: May 3, 2011

(54) MELT SPINNING BLENDS OF UHMWPE AND HDPE AND FIBERS MADE THEREFROM

(75) Inventors: Thomas Yiu-Tai Tam, Richmond, VA (US); Norman Aminuddin, Midlothian, VA (US); John A. Young, Midlothian, VA (US)

(73) Assignee: Honeywell International Inc., Morristown, NJ (US)

( * ) Notice: Subject to any disclaimer, the term of this patent is extended or adjusted under 35 U.S.C. 154(b) by 114 days.

(21) Appl. No.: 12/319,596

(22) Filed: Jan. 9, 2009

(65) Prior Publication Data

US 2010/0178503 A1 Jul. 15, 2010

(51) Int. Cl.
*D01D 5/088* (2006.01)
*D01D 5/16* (2006.01)
*D01F 1/10* (2006.01)
*D01F 6/04* (2006.01)
*D02G 3/02* (2006.01)

(52) U.S. Cl. .......... 264/103; 264/210.6; 264/210.7; 264/210.8; 264/211.14; 264/211.22; 264/211.23

(58) Field of Classification Search .......... 264/103, 264/210.6, 210.7, 210.8, 211.14, 211.22, 264/211.23
See application file for complete search history.

(56) References Cited

U.S. PATENT DOCUMENTS

| | | | |
|---|---|---|---|
| 4,228,118 A | 10/1980 | Wu et al. | 264/210.8 |
| 4,281,070 A | 7/1981 | Scheetz et al. | 524/528 |
| 4,413,110 A | 11/1983 | Kavesh et al. | 526/348.1 |
| 4,545,950 A * | 10/1985 | Motooka et al. | 264/210.6 |
| 5,234,552 A | 8/1993 | McGrew et al. | 203/18 |
| 5,256,358 A | 10/1993 | Shiraki et al. | 264/210.7 |
| 5,474,845 A | 12/1995 | Turunen et al. | 428/364 |
| 6,448,359 B1 | 9/2002 | Kavesh | 526/352 |
| 6,524,742 B1 * | 2/2003 | Emanuel et al. | 429/129 |
| 6,599,982 B2 | 7/2003 | Oriani | 525/191 |
| 2002/0132950 A1 * | 9/2002 | Smith et al. | 526/352 |
| 2005/0277717 A1 * | 12/2005 | Joshi et al. | 524/261 |
| 2006/0020064 A1 * | 1/2006 | Bauer et al. | 524/115 |
| 2010/0204427 A1 | 8/2010 | Ren | 526/352 |

OTHER PUBLICATIONS

Thermal, Mechanical, and Rheological Behavior of Blends of Ultrahigh and Normal-Molecular Weight Polyethylenes, S.K. Bhateja et. al., *Poly. Eng. & Sci.*, 23(16), 888-893 (1983).
Extrusion Instabilities and Wall Slip, M.M. Denn, *Annual Review of Fluid Mechanics*, 33,365-287 (2001).

* cited by examiner

*Primary Examiner* — Leo B Tentoni
(74) *Attorney, Agent, or Firm* — Erika S. Wilson

(57) ABSTRACT

Compositions that are intimate blends of ultrahigh molecular weight polyethylene and high-density polyethylene (HDPE), and which are melt spinnable. The compositions include certain quasi-spherical particles. Also disclosed is a method of melt spinning from such compositions and the multi-filament fibers produced thereby. The fibers of the invention are useful in a variety of applications.

7 Claims, 2 Drawing Sheets

MELT SPINNING BLENDS OF UHMWPE AND HDPE AND FIBERS MADE THEREFROM

BACKGROUND OF THE INVENTION

1. Field of the Invention

The invention relates to compositions that are blends of ultrahigh molecular weight polyethylene (UHMWPE) and high-density polyethylene (HDPE) which are capable of being melt spun. The invention includes the method of melt spinning and the fibers produced thereby.

2. Description of the Related Art

HDPE is generally considered to encompass linear polyethylene having weight average molecular weights in the range from about 20,000 to about 250,000 Daltons. UHMWPE is generally considered to encompass linear polyethylene having weight average molecular weight exceeding about 500,000 Daltons.

Melt spinning of HDPE to produce strong fibers is well known in the art and is taught, for example, in U.S. Pat. Nos. 4,228,118 and 5,474,845. Melt spinning is an easily and economically practiced technology. Attainable fiber strength and resistance to creep under sustained loads are known to increase with molecular weight; however so also does melt viscosity. The very high melt viscosity of UHMWPE has prevented its melt spinning in a conventional manner, either because required extrusion pressures were beyond equipment capabilities, or because melt fracture occurred producing rough filaments.

Solution spinning of UHMWPE to produce very strong fibers is also well known in the art and is taught, for example, by U.S. Pat. Nos. 4,413,110 and 6,448,359. Solution spinning bypasses the limitations of the high melt viscosity of UHMWPE, but requires circulation and recovery of large volumes of solvent with attendant high capital and operating costs.

To address the problem of high melt viscosity, U.S. Pat. No. 5,234,552 describes a process wherein an UHMWPE is extruded through a die with a lubricating material being injected through a ring just prior to the die. The lubricant disclosed was a low molecular weight ethylene-acrylic acid copolymer trade named "ACCUFLOW".

U.S. Pat. No. 5,256,358 describes a process for the extrusion of a single strand of UHMWPE.

U.S. Pat. No. 4,281,070 describes an UHMWPE blend containing an intermediate molecular weight polyethylene in a molecular weight range of from about 400,000 to 600,000, and a finely divided nucleating agent such as pyrogenic silica. The blend was processable by injection molding and is said to be processable with conventional melt forming equipment such as screw extruders. The patent teaches away from blends of intermediate molecular weight polyethylene and UHMWPE.

U.S. Pat. No. 6,599,982 describes the use of fluoroelastomers to improve the extrusion processability of polyethylene. It indicates that mineral particulates have a deleterious effect.

An investigation titled "Thermal, Mechanical, and Rheological Behavior of Blends of Ultrahigh and Normal-Molecular Weight Polyethylenes", S. K. Bhateja et. al., *Poly. Eng. & Sci.*, 23(16), 888-893 (1983), concluded that the addition of normal molecular weight linear polyethylene even up to 40 weight percent does not sufficiently improve the flow behavior of UHMWPE to make it amenable to conventional melt processing.

In an article titled "Extrusion Instabilities and Wall Slip", M. M. Denn, *Annual Review of Fluid Mechanics*, 33, 365-287 (2001), it is suggested that extrusion instabilities such as melt fracture are related to the onset of wall slip. Denn reported onset of roughness in low density linear polyethylene at a wall stress of the order of 0.1 MPa and unsteady flow at wall a stress on the order of 0.3 MPa.

Although each of these references represented a contribution to the state of the art, a need still exists for a polyethylene composition that can exploit the advantages of UHMWPE and yet is melt spinnable into multi-filament fiber and yarn.

SUMMARY OF THE INVENTION

In accordance with this invention, there is provided a polyethylene melt spinning composition comprising an intimate blend of:
  a) about 50 to about 90 percent by weight of an UHMWPE having an intrinsic viscosity of from about 6 to about 15 dl/g;
  b) about 10 to about 50 percent by weight of an HDPE having an intrinsic viscosity of from about 0.75 to about 3 dl/g; and
  c) about 0.1 to about 1 percent by weight of a material comprising quasi-spherical particles having a weight average particle size of from about 0.05 to about 10 micrometers and a Mohs' hardness of at least about 4, the particles comprising at least about 50 percent by weight of inorganic non-metallic materials;
wherein the polyethylene portion of the intimate blend has an intrinsic viscosity of from about 2.4 dl/g to about 5 dl/g and a ratio of weight average to number average molecular weight of at least about 7, with all intrinsic viscosities being measured in decalin at 135° C. by ASTM D1601-99.

Also in accordance with this invention, there is provided a method of producing a high strength polyethylene multi-filament fiber comprising the steps of:
  a) forming an intimate blend of a composition comprising about 50 to about 90 percent by weight of an UHMWPE having an intrinsic viscosity of from about 6 to about 15 dl/g; about 10 to about 50 percent by weight of an HDPE having an intrinsic viscosity of from about 0.75 to about 3 dl/g; and about 0.1 to about 1 percent by weight of a material comprising quasi-spherical particles having a weight average particle size of from about 0.05 to about 10 micrometers and a Mohs' hardness of at least about 4, the particles comprising at least about 50 percent by weight of inorganic non-metallic materials; wherein the polyethylene portion of the blend has an intrinsic viscosity of from about 2.4 dl/g to about 5 dl/g and a ratio of weight average to number average molecular weight of at least about 7, with all the intrinsic viscosities being measured in decalin at 135° C. by ASTM D1601-99;
  b) spinning a melt of the blend through a spinneret at an apparent shear rate at least about 250 $sec^{-1}$ to form a plurality of substantially smooth melt filaments;
  c) rapidly quenching the melt filaments to form solid filaments; and
  d) stretching the melt filaments to a stretch ratio of x:1 and stretching the solid filaments to a stretch ratio of y:1; wherein y is at least about 2 and the product x times y is at least about 10.

In further accordance with this invention, there is provided a melt spun polyethylene multi-filament fiber having an intrinsic viscosity of from about 2.4 to about 5 dl/g measured in decalin at 135° C. by ASTM D1601-99, a ratio of weight average to number average molecular weight of at least about 7, and containing about 0.1 to about 1 percent by weight of a material comprising quasi-spherical particles having a weight average particle size from about 0.05 to about 10 micrometers and a Mohs' hardness of at least about 4, the particles comprising at least 50 percent by weight of inorganic non-metallic materials, wherein each of the individual filaments has substantially smooth surfaces.

The present invention provides a polyethylene melt spinning composition that is based on UHMWPE and HDPE and is melt processable into the desired multi-filament fibers. It has been found that the addition of the aforementioned quasi-spherical particles to certain blends of UHMWPE and HDPE provide a spinning composition that can be readily used to form multi-filament fibers, and the spinning can be conducted using typical equipment and operating conditions. The resultant fibers may be utilized in a variety of applications, with the desirable properties of UHMWPE fibers being generally retained.

DETAILED DESCRIPTION OF THE INVENTION

Figure 1:
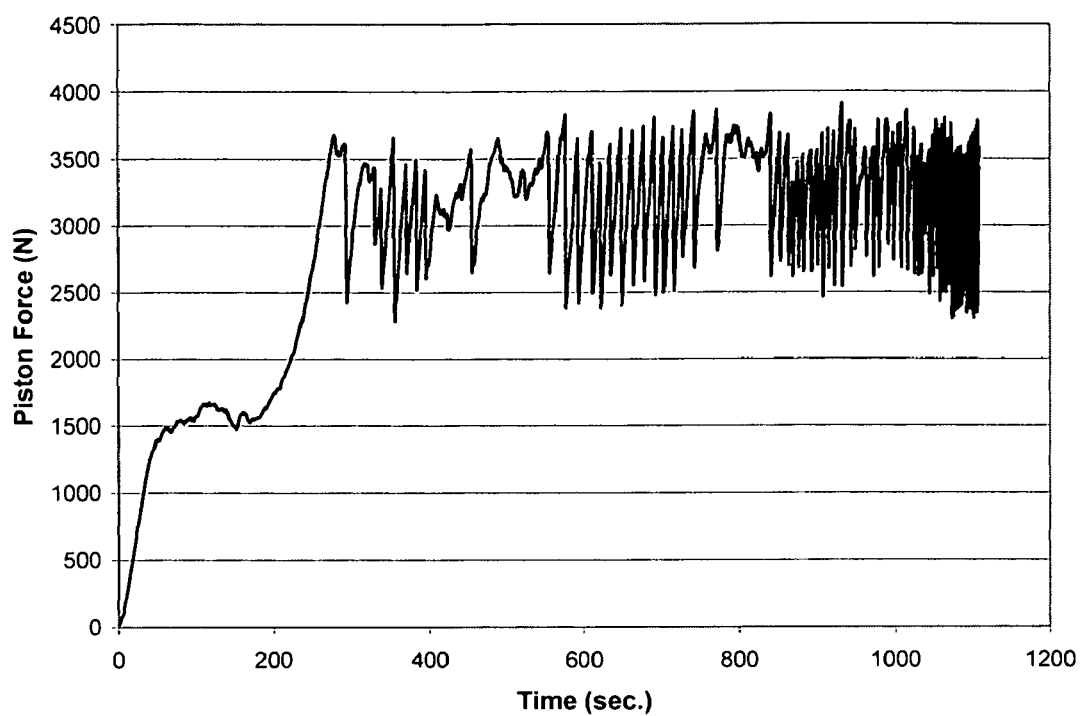
FIG. 1 shows the pressure trace during capillary rheometer extrusion of a 70/30(w/w) UHMWPE/HDPE blend containing no additives as described in Comparative Example 2.

For the purposes of the present invention, HDPE is defined as a linear polyethylene having fewer than about 10 methyl groups per 1000 carbon atoms and having an intrinsic viscosity from about 0.6 deciliters/g (dl/g) to about 3.2 dl/g. UHMWPE is defined as a linear polyethylene having fewer than about 10 methyl groups per 1000 carbon atoms and having an intrinsic viscosity greater than 5 dl/g. The intrinsic viscosities of the HDPE and the UHMWPE are measured in decalin solution at 135° C. by ASTM D1601-99. The following relationship between weight average molecular weight ($\overline{M}_w$) and IV recommended by the Polymer Handbook, Second Ed., J. Brandrup and E. H. Immergut, Ed., John Wiley and Sons, New York, 1975, p. IV-7 will be assumed:

$$IV, \text{deciliters/g (dl/g)} = 0.00062 \, \overline{M}_w^{0.7}$$

These definitions of HDPE and UHMWPE are in essential accord with the generally accepted understandings of these materials, but are of greater particularity.

Melt spinnable blends of UHMWPE and HDPE are prepared in accordance with this invention. The amount of the UHMWPE in the blend is from about 50 to about 90 percent by weight, preferably from about 65 to about 85 percent by weight, and more preferably from about 70 to about 85 percent by weight, based on the total weight of the composition. The amount of the HDPE in the blend is from about 10 to about 50 percent by weight, preferably from about 15 to about 35 percent by weight, and more preferably from about 15 to about 30 percent by weight, based on the total weight of the composition. If the amount of UHMWPE in the blend is less than about 50 weight percent, then the desirable properties of the UHMWPE may not be present in the blend. If the amount of UHMWPE in the blend is great than about 90 weight percent, then the blend may be difficult to melt process.

The intrinsic viscosity of the UHMWPE utilized herein is from about 6 dl/g to about 15 dl/g, and preferably from about 6 dl/g to about 12 dl/g. The intrinsic viscosity of the HDPE utilized herein is from about 0.75 to about 3.5 dl/g, and preferably is from about 1 dl/g to about 2.5 dl/g. It should be noted that unless otherwise stated all of the intrinsic viscosities mentioned herein are measured in decalin at 135° C. in accordance with ASTM D1601-99.

The polyethylene portion of the intimate blend has an intrinsic viscosity of from about 2.4 dl/g to about 5 dl/g and a ratio of weight average to number average molecular weight of at least about 7. Preferably, the polyethylene portion of the intimate blend has a ratio of weight average molecular weight to number average molecular weight of at least about 10.

The intimate blend of the invention also includes a material comprising quasi-spherical particles having a weight average particle size of from about 0.05 to about 10 micrometers and a Mohs' hardness of at least about 4. Preferably, these particles have a weight average particle size of from about 0.06 to about 5 micrometers, and more preferably from about 0.075 to about 1 micrometers. Most preferably the average particle size is from about 0.075 to about 0.5 micrometers. Preferably the Mohs' hardness is at least about 5.

For purposes of this invention, quasi-spherical particles are defined as particles having an average ratio of maximum to minimum transverse dimensions of less than about 2.5:1. The surfaces of the quasi-spherical particles may be planar, curved or irregular.

The material comprising the quasi-spherical particles are present in the composition and the fibers produced therefrom in an amount of from about 0.1 to about 1 percent by weight, more preferably from about 0.1 to about 0.8 percent by weight, and most preferably from about 0.2 to about 0.7 percent by weight, based on the total weight of the composition or fiber.

The particles contain at least about 50 percent by weight, of inorganic non-metallic materials, such as titanium dioxide. Other non-metallic materials that may be utilized herein include zirconium oxide, titanium sulfide, zirconium sulfide, aluminum oxide, and the like. Preferably, the particles comprise titanium dioxide, and most preferably the particles are comprised of titanium dioxide in the anatase crystalline form.

The blends of this invention may be melt processed using typical melt processing apparatus and under typical melt processing conditions. Preferably, the intimate blend is formed in the molten state in an intermeshing co-rotating twin screw extruder. The twin screw extruder preferably has a length to diameter ratio at least about 20:1, more preferably at least about 30:1 and most preferably at least about 40:1. Preferably, the intimate blend is passed in the molten state from the twin screw extruder to a melt pump and therefrom to a multi-hole spinneret.

Once a melt blend is formed, it can be spun into multi-filament fibers through a multi-hole spinneret. The spinning is conducted at an apparent shear rate at the wall of the spinneret at least about 250 sec$^{-1}$. This results in a plurality of smooth melt filaments. The melt filaments are then rapidly quenched using typical conditions, such as a water quench, to form solid filaments. Preferably, the water is at a temperature between about 1° C. and 20° C.

The melt filaments are stretched under typical stretching conditions to a stretch ratio of x:1, and the solid filaments are also stretched to a stretch ratio of y:1, wherein y is at least about 2. The product of x times y is at least about 10. Preferably, the melt filaments issuing from the spinneret are stretched at a ratio of at least about 2:1, more preferably at least about 5:1 and most preferably at least about 10:1.

Apparent shear rate ($\dot{\gamma}_a$) at the wall of the spinneret is defined by the following relationship:

$$\dot{\gamma}_a = \frac{4Q}{\pi R^3} \sec^{-1} \qquad \text{Eq. 1}$$

where: R is the radius of a spinneret hole, cm and
Q is the volumetric flow rate through that hole, cm³/sec Preferably, the stretching of the solid filaments is in at least two stages, with at least one stretching stage at a temperature at least about 130° C. Preferably, the stretching of the solid filaments is conducted in an air oven where the air is in a turbulent flow regime.

For purposes of this invention, a fiber is defined as an elongate body the length dimension of which is much greater than the transverse dimensions of width and thickness. Accordingly, the term fiber includes one or a plurality of filaments, ribbons, strips and the like.

The diameters of the individual fibers of the melt spun polyethylene multi-filament fiber preferably is less than about 0.02 cm, more preferably less than about 0.01 cm, and most preferably less than about 0.005 cm.

The melt spun polyethylene fibers preferably have a tenacity of at least about 20 g/d (17.6 cN/dtex), more preferably at least about 22 g/d (19.4 cN/dtex), and most preferably at least about 25 g/d (22.0 cN/dtex).

The fibers of the invention are characterized as having a substantially smooth surface. As used herein, "substantially smooth" means that the surfaces are smooth or almost smooth. Such surfaces are indicative of a fiber that has been melt spun without difficulty.

The fibers of the invention are useful in ropes, hawsers, impact absorption, composite reinforcements, textiles, sutures, dental floss and other applications. They have many of the attributes of fibers formed from UHMWPE alone and are strong enough for many demanding applications.

The following non-limiting examples are presented to provide a more complete understanding of the invention. The specific techniques, conditions, materials, proportions and reported data set forth to illustrate the principles of the invention are exemplary and should not be construed as limiting the scope of the invention.

EXAMPLES

Capillary Rheometry

The melt flow properties of several of the materials that are described in the Examples below were characterized by capillary rheometry using a Dynisco Capillary Rheometer, Model LCR 7000. In all tests, the capillary used had a diameter of 0.0762 cm and a length of 2.51 cm. The rheometer temperature was 280° C., the piston speed was 1 cm/min., and the apparent shear rate at the wall of the capillary, $\dot{\gamma}_a$, as defined by Eq. 1 above, was 275 sec$^{-1}$.

The force on the piston was recorded. Pressure, P, in the barrel of the rheometer was equal to the force on the piston divided by the cross-sectional area of the barrel. Shear stress at the wall of the capillary was calculated from Eq. 2 below and apparent shear viscosity was calculated from Eq. 3 below.

$$\tau_w = \frac{R \Delta P}{2L}, \text{Pa} \qquad \text{Eq. 2}$$

$$\mu_a = \frac{\tau_w}{\dot{\gamma}_w}, \text{Pa-sec.} \qquad \text{Eq. 3}$$

where:
$\tau_w$ is the shear stress at the wall of the capillary, Pa
R is the radius of the capillary, cm
$\Delta P$ is the pressure drop across the capillary, Pa
L is the length of the capillary, cm
$\mu_a$ is the apparent shear viscosity, Pa-sec

Comparative Example 1

A Phillips process HDPE having an intrinsic viscosity of 2 dl/g was employed in this example. It possessed about 1 methyl group per 1000 carbon atoms. The $M_w/M_n$ ratio of Phillips process HDPE is typically about 12.

The HDPE pellets were charged to the capillary rheometer and the apparent shear viscosity of the melt was measured as described above. The apparent shear viscosity was 324 Pa-sec under the measurement conditions. The filament extruded from the capillary was smooth showing no evidence of melt fracture.

Comparative Example 2

UHMWPE powder and HDPE pellets in 70/30 (w/w) proportions were mixed together in a tumble mixer for one hour. The UHMWPE had an intrinsic viscosity of 9 dl/g and less than 1 methyl group per 1000 carbon atoms. The $M_w/M_n$ ratio of the UHMW PE was greater than 5. The HDPE was the same material described in Comparative Example 1. The mixed batch was fed continuously into a Brabender intermeshing twin screw extruder having a length to diameter (L/D) ratio of 40:1 and operated at a temperature range of 280-325° C. and 150-190 rpm. An intimate blend of the two polyethylene materials was formed in the extruder. The molten extrudate issued through a strand die into a water quench bath where it was solidified. The intrinsic viscosity of the strand material measured later in decalin solution at 135° C. by ASTM D1601-99 was 3.2 dl/g. The ratio of weight average molecular weight to number average molecular weight of the blend was greater than 7.

A section of the strand was cut into small pieces and placed in the barrel of the same capillary rheometer where it was melted at a temperature of 280° C. The force on the piston was recorded and is shown in FIG. 1. It is seen that a steady force was not achieved but that severe oscillations occurred, an indication of "melt fracture". Shear stress at the wall of the capillary varied irregularly from a low of about 0.24 MPa to a high of about 0.40 MPa. The extrudate from the capillary die was distorted showing "melt fracture".

Example 1

UHMWPE powder, HDPE pellets and titanium dioxide powder were tumble mixed together for one hour in proportions of 70/29.5/0.5 (w/w/w). The UHMWPE and HDPE materials were the same materials described in Comparative Examples 1 and 2 above. The titanium dioxide powder (from Kemira, Inc.) was in the anatase crystalline form and consisted of quasi-spherical particles having an average particle size of 0.17 micrometers. The hardness of TiO$_2$ in the anatase crystalline form is reported to be 5.5-6 on the Mhos' scale. (Ref. Kirk-Othmer Encyclopedia of Chemical Technology, Fourth Ed., Vol 24, p. 236, John Wiley & Sons, NY, 1997).

The mixed batch was fed continuously into the same Brabender intermeshing twin screw extruder and an intimate blend of the three materials was formed in the extruder under the same conditions as in Comparative Example 2. The molten extrudate issued through a strand die into a water quench bath where it was solidified. The intrinsic viscosity of the strand was 3.2 dl/g. The ratio of weight average molecular weight to number average molecular weight of the blend was greater than 7.

A section of the strand was cut into small pieces and placed in the barrel of the capillary rheometer where it was melted and extruded through the same capillary die under the same operating conditions as described in Comparative Example 1.

Figure 2:
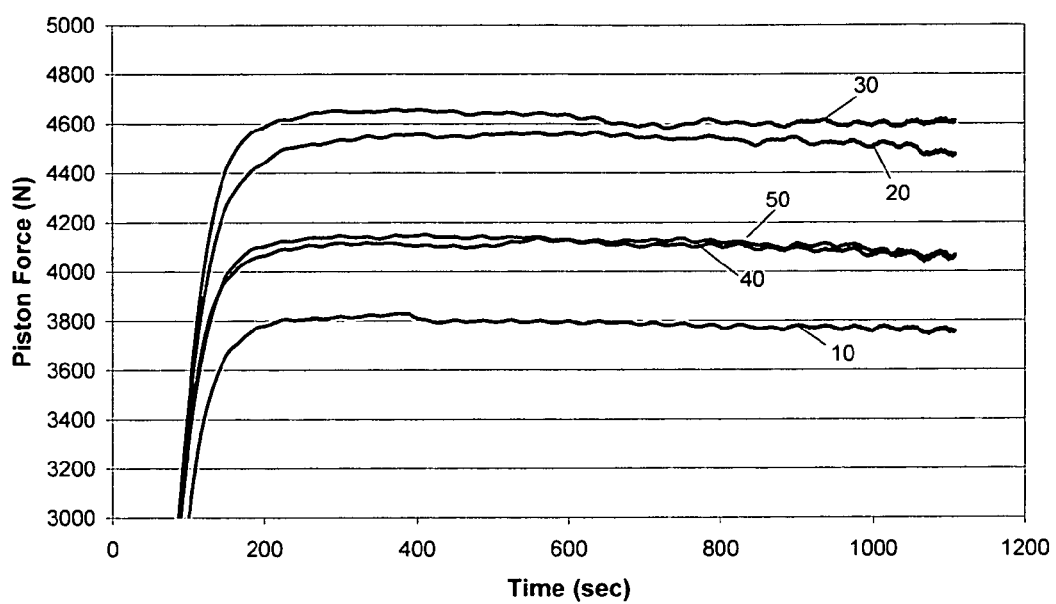
FIG. 2 shows pressure traces during capillary rheometer extrusion of UHMWPE/HDPE blends as described in other examples.

The force on the piston was recorded and is shown in FIG. 2 as line 10. It is seen that a steady force was achieved in about 400 seconds at a force of about 3800 Newtons corresponding to a shear stress at the wall of the capillary of about 0.40 MPa and an apparent shear viscosity of about 1470 Pa-sec. In contrast to Comparative Example 2, the extrudate from the capillary of this blend containing 0.5 wt. % of $TiO_2$ was smooth, showing no evidence of melt fracture.

Comparative Example 3

UHMWPE powder, HDPE pellets and calcium stearate powder (from Alfa Aesar Inc.) were tumble mixed together for one hour in proportions of 70/29.50/0.50 (w/w/w). The UHMW PE and HDPE materials were the same materials described in Comparative Example 2 above.

The mixed batch was fed continuously into the same Brabender intermeshing twin screw extruder and an intimate blend of the three materials was formed in the extruder. The molten extrudate issued through a strand die into a water quench bath where it was solidified. The intrinsic viscosity of the strand was 3.2 dl/g. The ratio of weight average molecular weight to number average molecular weight of the blend was greater than 7.

A section of the strand was cut into small pieces and placed in the barrel of the capillary rheometer where it was melted and extruded through the same capillary die under the same operating conditions as described in Comparative Example 1. The force on the piston was recorded and is shown in FIG. 2 as line 20. It is seen that a steady force was achieved in about 400 seconds at a force of about 4550 Newtons corresponding to a shear stress at the wall of the capillary of about 0.48 MPa and an apparent shear viscosity of about 1760 Pa-sec. However, the extrudate from the capillary of this blend containing calcium stearate was not smooth, but showed a "shark-skin" texture, which is an initial stage of melt fracture.

Example 2

UHMWPE powder, HDPE pellets, calcium stearate powder and titanium dioxide powder were tumble mixed together for one hour in proportions of 70/29.25/0.50/0.25 (w/w/w/w). The materials were the same as described in the previous examples and comparative examples.

The mixed batch was fed to the same Brabender extruder wherein an intimate blend was formed of the four materials and extruded as a strand. The intrinsic viscosity of the strand was 3.2 dl/g. The ratio of weight average molecular weight to number average molecular weight of the blend was greater than 7.

The extrudate was cut into small pieces and charged to the barrel of the capillary rheometer where it was melted and extruded through the same capillary die under the same operating conditions as described in Comparative Example 1. The force on the piston is shown in FIG. 2 as line 30. It is seen that a steady force was achieved in about 400 seconds at a force of about 4650 Newtons corresponding to a shear stress at the wall of the capillary of about 0.49 MPa and an apparent shear viscosity of about 1800 Pa-sec. The extrudate from the capillary of this blend containing 0.5 wt. % calcium stearate and 0.25 wt. % $TiO_2$ was smooth showing no evidence of melt fracture although the shear stress and the apparent shear viscosity were somewhat higher than for the blend containing only 0.5 wt. % calcium stearate.

Example 3

UHMWPE powder, HDPE pellets, calcium stearate powder and titanium dioxide powder were tumble mixed together for one hour in proportions of 70/29/0.50/0.50 (w/w/w/w). The materials were the same as described in the previous examples and comparative examples.

The mixed batch was fed to the same Brabender extruder wherein an intimate blend was formed of the four materials and extruded as a strand. The intrinsic viscosity of the strand was 3.2 dl/g. The ratio of weight average molecular weight to number average molecular weight of the blend was greater than 7.

The strand was cut into small pieces and charged to the barrel of the capillary rheometer where it was melted and extruded through the same capillary die under the same operating conditions as described in Comparative Example 1. The force on the piston is shown in FIG. 2 as line 40. It is seen that a steady force was achieved in about 400 seconds at a force of about 4100 Newtons corresponding to a shear stress at the wall of the capillary of about 0.44 MPa and an apparent shear viscosity of about 1580 Pa-s. The extrudate from the capillary of this blend containing 0.5 wt. % of $TiO_2$ and 0.5 wt. % calcium stearate was smooth, showing no evidence of melt fracture.

Example 4

UHMWPE powder, HDPE pellets, calcium stearate powder and titanium dioxide powder were tumble mixed together for one hour in proportions of 70/29.5/0.25/0.25 (w/w/w/w). The materials were the same as described in the previous examples and comparative examples.

The mixed batch was fed to the same Brabender extruder wherein an intimate blend was formed of the four materials and extruded as a strand. The intrinsic viscosity of the strand was 3.2 dl/g. The ratio of weight average molecular weight to number average molecular weight of the blend was greater than 7.

The strand was cut into small pieces and charged to the barrel of the capillary rheometer where it was melted and extruded through the same capillary die under the same operating conditions as described in Comparative Example 1. The force on the piston is shown in FIG. 2 as line 50. It is seen that a steady force was achieved at force of about 4150 Newtons corresponding to a shear stress at the wall of the capillary of about 0.44 MPa and an apparent shear viscosity of about 1600 Pa-s. The extrudate from the capillary of this blend containing 0.5 wt. % of $TiO_2$ and 0.5 wt. % calcium stearate was smooth, showing no evidence of melt fracture.

The data of Comparative Examples 1 and 2 and Examples 1-4 are summarized in Table I, below.

TABLE I

| Ex or Comp. Ex. | wt. % UHMW PE | wt. % HDPE | wt. % CaSt | wt % TiO2 | Piston Force, N | Shear Stress, MPa | Apparent Visc, Pa-s | Extrudate Surface |
|---|---|---|---|---|---|---|---|---|
| Comp. 1 | 0 | 100 | 0 | 0 | 838 | 0.089 | 324 | smooth |
| Comp. 2 | 70 | 30 | 0 | 0 | unsteady | unsteady | — | rough |
| 1 | 70 | 29.5 | 0 | 0.5 | 3800 | 0.40 | 1470 | smooth |
| Comp. 3 | 70 | 29.5 | 0.5 | 0 | 4550 | 0.48 | 1760 | shark-skin |
| 2 | 70 | 29.25 | 0.5 | 0.25 | 4650 | 0.49 | 1800 | smooth |
| 3 | 70 | 29 | 0.5 | 0.5 | 4100 | 0.44 | 1580 | smooth |
| 4 | 70 | 29.5 | 0.25 | 0.25 | 4150 | 0.44 | 1600 | smooth |

It will be seen that an inventive intimate blend of 70 wt. % UHMWPE having an intrinsic viscosity of 9 dl/g with a HDPE having an intrinsic viscosity of 2 dl/g, the blend containing 0.25-0.50 wt. % $TiO_2$, could be extruded at 280° C. and at an apparent shear rate at the capillary wall of 275 $sec^{-1}$ without melt fracture. Apparent melt viscosity decreased upon increase of $TiO_2$ content from 0.25 wt. % to 0.50 wt. %.

Without being held to a particular theory of why the inventive compositions can be extruded without melt fracture, it is believed that the $TiO_2$ particles become lodged in imperfections in the wall of the capillary. This has the effect of pinning the boundary layer to the wall, preventing slippage and thus preventing flow instability. The particles must have sufficient hardness so as not to be ruptured by the shear stresses exerted by the melt.

Apparent melt viscosity increased upon increase of calcium stearate (having a Mohs' hardness of 3 or less) content from 0.25 wt. % to 0.50 wt. % at constant $TiO_2$ content. Addition of 0.50 wt. % calcium stearate to a 70/30 (w/w) blend of UHMWPE/HDPE reduced surface roughness from "rough" to "shark-skin".

Example 5

UHMWPE powder, HDPE pellets, calcium stearate powder and titanium dioxide powder were tumble mixed together for one hour in proportions of 70/29.5/0.25/0.25 (w/w/w/w). The materials were the same as described in the previous examples and comparative examples. The mixed batch was fed continuously to a Welding Engineers non-intermeshing twin screw extruder having a diameter of 2.032 cm and a length to diameter ratio of 36:1. The extruder barrel temperature was in a range of 300-320° C. and was operated at a range of 150-200 rpm. An intimate blend of the four materials were formed in the extruder and extruded in the form of a strand.

The cooled strand was chopped into pellets and fed continuously into a single screw extruder operating at 280-300° C. and 20-40 rpm. The single screw extruder had a diameter of 1.905 cm and a length to diameter ratio of 24:1. The outlet of this extruder was fitted with a melt pump and a five-hole spinneret. The spinneret holes were of 0.0457 cm diameter and had a length to diameter ratio of 3:1.

The blend of UHMWPE/HDPE was thereby melted and spun into a multi-filament fiber at a mass throughput rate of 10.63 g/min. Apparent shear rate in the spinneret was 5,394 $sec^{-1}$. The filaments were rapidly quenched in water upon passage to a first godet roll operating at a speed of 50 m/min. The stretch of the melt filaments between the spinneret and the water quench was at a ratio of 3:1. The individual melt spun filaments were of 0.0236 cm diameter and had smooth cylindrical surfaces. The intrinsic viscosity of the filaments was 3.2 dl/g. The ratio of weight average molecular weight to number average molecular weight of the filaments was greater than 7.

The as-spun filaments were wound up and transferred to a stretch bench where they were unwound and drawn twice in an air oven under turbulent flow conditions, first at a temperature of about 120° C. to a ratio of 2:1. The once drawn yarns were then redrawn at temperature of 130° C. and a ratio of 2.5:1. The final diameter of individual filaments was 0.0108 cm. Overall stretch of the filaments was at a ratio of 3:1×2:1×2.5:1 or 15:1.

Example 6

UHMWPE powder, HDPE pellets and titanium dioxide powder are tumble mixed together in proportions of 70/29.5/0.50 (w/w/w). The UHMWPE and HDPE materials are the same materials described in the examples and comparative examples above.

The mixed materials are fed continuously into an intermeshing twin screw extruder having a length to diameter ratio of 30:1. The extruder is operated at a temperature of 280° C. and a rotational speed of 200 RPM. An intimately blended melt of the two polyethylene materials and the $TiO_2$ are formed in the extruder.

The twin screw extruder is fitted with a melt pump and a multi-hole spinneret at its exit end. The melt blend passes from the extruder into the melt pump and thence into the spinneret. The spinneret has 360 capillary openings, each having a diameter of 0.04 cm and a length of 0.12 cm. The melt filaments extruded from the spinneret pass through an air gap wherein the melt filaments are stretched to a ratio of 10:1 and pass into a water quench bath maintained at a temperature of 10° C. The solidified melt-spun filaments are wound up on packages.

The packages of melt-spun filaments are transferred to the feed station of a two-zone stretching oven. The oven zone temperatures are 130° C. and 140° C. The air within the oven is maintained in a turbulent flow regime.

The filaments are stretched at a ratio of 5:1 while passing through the oven and are wound up into packages at its end. The drawn filaments have a tenacity of 20 g/d (17.6 cN/dtex), an elongation at break of 25% and a tensile factor, defined as tenacity times the square root of elongation at break, of 100 g/d It can be seen that the present invention provides a polyethylene melt spinning composition that is based on UHMWPE and HDPE contains the quasi-spherical particles that have certain properties. The spinning composition that can be readily used to form multi-filament fibers, and the spinning can be conducted using typical equipment and operating conditions. The resultant fibers may be utilized in a variety of applications and retain desirable UHMWPE properties.

Having thus described the invention in rather full detail, it will be understood that such detail need not be strictly adhered to but that further changes and modifications may suggest themselves to one skilled in the art, all falling within the scope of the invention as defined by the subjoined claims.

What is claimed is:

1. A method of producing a high strength polyethylene multi-filament fiber comprising the steps of:
   a) forming an intimate blend of a composition comprising about 50 to about 90 percent by weight of an UHMWPE having an intrinsic viscosity of from about 6 to about 15 dl/g; about 10 to about 50 percent by weight of an HDPE having an intrinsic viscosity of from about 0.75 to about 3 dl/g; and about 0.1 to about 1 percent by weight of a material comprising quasi-spherical particles having a weight average particle size of from about 0.05 to about 10 micrometers and a Mohs' hardness of at least about 4, said particles comprising at least 50 percent by weight of inorganic non-metallic materials; wherein the polyethylene portion of said blend has an intrinsic viscosity of from about 2.4 to about 5 dl/g and a ratio of weight average to number average molecular weight of at least about 7, with all said intrinsic viscosities being measured in decalin at 135° C. by ASTM D1601-99;
   b) spinning a melt of said blend through a spinneret at an apparent shear rate at least about 250 sec$^{-1}$ to form a plurality of substantially smooth melt filaments;
   c) stretching said melt filaments to a stretch ratio of x:1;
   d) rapidly quenching said melt filaments to form solid filaments; and
   e) stretching said solid filaments to a stretch ratio of y:1; wherein y is at least about 2 and the product x times y is at least about 10.

2. The method of claim 1, wherein said the polyethylene portion of said blend has a ratio of weight average to number average molecular weight at least about 10.

3. The method of claim 1, wherein said intimate blend comprises about 65 to about 85 percent by weight of said UHMWPE and about 15 to about 35 percent by weight of said HDPE.

4. The method of claim 1, wherein said particles comprise titanium dioxide.

5. The method of claim 4, wherein said titanium dioxide is in the anatase crystalline form.

6. The method of claim 1, wherein said intimate blend is formed in the molten state in an intermeshing, co-rotating twin screw extruder.

7. The method of claim 6, wherein said intimate blend is passed in the molten state from said twin screw extruder to a melt pump and therefrom to a spinneret.

* * * * *